United States Patent [19]

Robertson et al.

[11] 4,015,999

[45] Apr. 5, 1977

[54] PIGMENT COMPOSITIONS

[75] Inventors: George Heddle Robertson, Paisley; John Andrew Stirling, Glasgow, both of Scotland

[73] Assignee: Ciba-Geigy Corporation, Ardsley, N.Y.

[22] Filed: Dec. 19, 1975

[21] Appl. No.: 642,268

[30] Foreign Application Priority Data

Jan. 8, 1975 United Kingdom .............. 729/75
May 30, 1975 United Kingdom .......... 23570/75

[52] U.S. Cl. .............. 106/308 Q; 106/288 Q; 106/306; 106/308 F; 106/193 P; 106/193 D; 106/309; 264/117

[51] Int. Cl.² .................. C08J 3/00; C09C 1/00

[58] Field of Search ........ 106/308 Q, 308 F, 193 P, 106/193 D, 309; 264/117; 241/16

[56] References Cited

UNITED STATES PATENTS 3,127,412 3/1964 Gaertner et al. ............. 106/309
3,583,877 7/1971 Rosenblum et al. .......... 106/288 Q
3,586,247 6/1971 Perrins ............................ 106/309
3,844,811 10/1974 Brynko .......................... 106/288 Q Primary Examiner—Patrick P. Garvin
Assistant Examiner—J. V. Howard
Attorney, Agent, or Firm—Vincent J. Cavalieri

[57] ABSTRACT

Pigment composition in the form of free-flowing, non-dusting, non-aggregating, non sticky generally spherical beads which comprises from 50 to 80% by weight of a pigment or water insoluble dyestuff from 5 to 40% by weight of a normally solid water-insoluble organic compound carrier or mixture of carriers melting below 100° C, from 2.5 to 25% of an organic acid and from 1.5 to 25% of an organic base, the amount of acid plus base being from 5 to 35% by weight of the total composition in which are compatible with inks, paints and plastics, and can be readily incorporated into the same.

9 Claims, No Drawings

PIGMENT COMPOSITIONS

The present invention relates to pigment compositions suitable for colouring inks, particularly publication gravure inks, paints, plastics and rubber, and to a process for their production.

Pigments are generally produced in powder form and are usually used as such. Powders have several disadvantages, mainly in handling, since a large amount of dust is produced making them unpleasant to use. Also, powders are not always as free-flowing as is desired, and during manufacture of pigment powders separation of the pigment from the aqueous slurry is time consuming and dirty. A further disadvantage is that in order to colour a substance evenly, the powder must be evenly distributed throughout the substance and, particularly when colouring plastics, this can involve prolonged and expensive mechanical working. It has been proposed to produce pigmented polymers in bead form (see for example British patent specification Nos. 1,072,983 and 1,054,594), which can be easily mixed with and used to colour plastic materials. It has also been proposed to produce pigments and other substances in the form of a granulate by precipitating the pigment or other substance from an aqueous suspension in the presence of an organic compound as granulating agent (see for example British patent specification Nos. 1,178,846 and 1,238,118).

It is an object of the present invention to provide a pigment composition in a free-flowing, non-dusting, non-agregating, non-sticky generally spherical form based on organic materials which are compatible with inks, paints and plastics, and can be readily incorporated into the same.

According to the present invention, there is provided a pigment composition in the form of free-flowing, non-dusting, non-aggregating, non-sticky generally spherical beads which comprises from 50 to 80% by weight of a pigment or water insoluble dyestuff from 5 to 40% by weight of a normally solid water-insoluble organic compound carrier or mixture of carriers melting below 100° C. from 2.5 to 25% of an organic acid and from 1.5 to 25% of an organic base, the amount of acid plus base being from 5 to 35% by weight of the total composition.

It is essential that the combination of acid and base is water-insoluble when the aqueous phase containing them is rendered substantially neutral.

Optionally the composition may also contain a salt of a metal of Group II or III of the Periodic Table, and the organic acid.

The present invention also provides a process for the production of a pigment composition which comprises contacting with agitation an aqueous dispersion of a pigment or water-insoluble dyestuff with a normally solid, water-insoluble organic carrier melting below 100° C. at a temperature at which the organic carrier is molten, in the presence of an aqueous protective colloid, and a mixture of an organic acid and an organic base rendered insoluble by making the pH of the mixture substantially neutral, and allowing the aqueous phase to become substantially free of pigment or water-insoluble dyestuff by its association with the organic carrier and recovering the resulting pigmented beads, after cooling if necessary.

Optionally a water-soluble salt of a metal of Group II or III of the Periodic Table may also be added.

The organic carrier may be a single compound or it can be a mixture of compounds which give a mixed melting point below 100° C. in the preferable range of 40° to 100° C. It is not necessary for the mixture of compounds to have a sharp melting point, which of course a single compound would have, but it may melt over a range of a few degrees, e.g. over 15°–20° centigrade.

The choice of organic carrier will largely be governed by the needs of the system in which the beads are to be used to ensure adequate solubility in and compatibility with the solvent and resin or polymer respectively. Examples of suitable organic carriers include fatty alcohols, such as cetyl alcohol and stearyl alcohol, fatty esters such as cetyl palmitate, fatty amides such as oleamide and palmitamide, fatty esters of polyols such as hardened castor oil, benzoic acid esters of polyols, phthalate esters such as dicyclohexyl phthalate, fatty oxazolines such as stearyl oxazoline, alkylimides such as N-dodecyl phthalimide and N-octyl phthalimide alkyl hydantoins such as 3-stearyl-5,5-dimethyl hydantoin 1-hydroxyethyl-3-stearyl-5,5-dimethyl hydantoin.

In addition to using single compounds, mixtures of compounds may be used, such as mixtures of those specified above and mixtures containing compounds which may melt above 100° C., but give rise to mixtures which melt below 100° C., e.g. cholesterol and magnesium behenate. Resinous materials which soften to give highly immobile liquids cannot satisfactorily be used alone. However, these compounds can be used in mixtures with the above organic carriers. Such resinous materials which may soften above or below 100° C. are typified by the following compounds, i.e. hydrocarbon resins such as Hercules A.80, A.100, A.130 and A.150, zinc rosinate and rosin esters.

Examples of acidic compounds of particular value are those based on $C_8$ to $C_{22}$ alkyl or alkenyl fatty carboxylic acids, $C_8$ to $C_{22}$ alkyl or alkenyl ring-substituted benzoic acids, $C_8$ to $C_{22}$ alkoxy or alkenyloxy ring substituted benzoic acids, $C_8$ to $C_{22}$ N-alkyl or alkenyl phthalamic acids or $C_8$ to $C_{22}$ alkyl or alkenyl ring-substituted benzene sulphonic acids and especially the rosin acids such as wood rosin and its hydrogenerated form, Staybelite resin (Staybelite is a trade mark). Suitable basic compounds are the $C_8$ to $C_{22}$ fatty primary amines such as are available commercially in mixtures as Armeen S, T, HT, C, 12 and 8 (Armeen is a trade mark) and rosin amine obtainable commercially as Rosin Amin D. Fatty secondary amines of value are N,N-di-$C_8$ to $C_{22}$ alkyl or alkenyl amines which are commercially available in mixtures in such products as Armeen 2S, or 2C (Armeen is a trade mark). Suitable tertiary amines are the N,N-dimethyl derivatives of the above primary amines. Suitable polyamines include fatty diamines of the N-$C_8$ to $C_{22}$ alkyl or alkenyl 1,3-propylene diamine type, e.g. Duomeen C or T (Duomeen is a trade mark) and the alkyl imidazoline such as 1-(2-aminoethyl)-2-$C_7$ to $C_{17}$ aslkyl or alkenyl-2-imidazoline, —e.g. Imidrol SC or Imidrol LC (Imidrol is a trade mark) and the fatty triamines of the type N-$C_8$ to $C_{22}$ alkyl or alkenyl dipropylenetriamines, —e.g. Trinoram S (Trinoram is a trade mark).

The aqueous protective colloid may be used in an amount such as will form a solution of about 0.2 to 5% w/w, but preferably 0.5 to 2% w/w. based on the amount of pigment plus organic carrier, and may be, for example, cellulose derivatives such as hydroxy ethyl cellulose, hydroxy propyl cellulose, polyvinyl alcohol, polyethylene oxide, polypropylene oxide, copolymers of ethylene oxide and propylene oxide, adducts of ethylene oxide or propylene oxide, polyvinyl pyrrolidone and its copolymers or mixtures of these compounds. The preferred compounds are those of the hydroxy ethyl cellulose type as exemplified by the Natrosol range of the Hercules Powder Company. When polymers of the ethylene or propylene oxide type are being used it is advantageous to carry out the preparation above the cloud point (see Kirk-Othmer's Encyclopedia of Chemical Technology, Vol. 19, p.531) of the surfactant, and at the lower levels of concentrations.

The aqueous pigment dispersion may be one obtained directly from an aqueous preparation, for example, an azo coupling. In this case the dispersion may contain additives of general application in pigment technology, such as a surfactant and a dispersibility aid, but these additives must allow or aid the bead formation and not affect the melting point or thickness of the beads to such an extend that the final composition has undesired characteristics. In the case of an azo pigment, the aqueous coupling may contain the acid or base of this invention.

The pigment dispersion may also be a redispersed pigment powder. The aqueous presscake or powder may be redispersed into water by stirring or by high energy dispersion, such as bead milling. This dispersion of the presscake or powder is generally carried out in the presence of a surfactant, examples of which include the water-soluble forms of the acids and bases of this invention, e.g. alkali rosinate or stearate or fatty amine acetate.

The particle size of the molten organic carrier and the resulting pigmented beads may be up to 5 mm. diameter, preferably from 0.5 to 2 mm. diameter. When the pigment or dyestuff dispersion is contacted with the organic carrier at a temperature at which the latter is a liquid the agitation is continued preferably until the aqueous phase is substantially free from pigment. The particle size can be controlled by varying the stirring rate and proportion of protective colloid. The more violent the agitation and the higher the protective colloid concentration the smaller the resulting beads.

The amounts of the various components in the composition may vary over a wide range. The amount of pigment may be from 50 to 80, preferably from 50 to 70% by weight. The amount of organic carrier may be from 5 to 40%, preferably from 10 to 40, most preferably from 15 to 40% by weight. The amount of organic acid may be from 2.5 to 25%, preferably from 5 to 17.5% by weight, and the amount of organic base may be from 1.5% to 25%, preferably from 2.5 to 25%, most preferably from 5 to 17.5% by weight, such that the amount of acid plus base is from 5 to 35%, preferably from 10 to 35% by weight.

The organic acid and base are added to the mixture in water as the alkaline metal or acid salts, respectively, which are generally soluble in water. For example, the acid may be added as its alkali metal salt, e.g. its sodium salt; and the base may be added as a salt with an acid, e.g. its acetate salt. This solubilised form may be as a clear solution or as a hazy dispersion depending on the concentration and solubility of the various salts. The acid and base are then rendered insoluble by adjusting the pH of the mixture to a range from 6 to 8, preferably about 7, using, e.g. acetic acid or sodium hydroxide.

In addition, soluble salts of a metal of Group II or III of the Periodic Table may be added, especially where there is a stoichiometric excess of the organic acid over the organic base.

The soluble metal salts and the organic acid form water insoluble salts, e.g. calcium resinate, which then form part of the resulting pigment composition.

Examples of suitable water soluble salts are the chlorides or acetates of magnesium, calcium strontium, barium or zinc; water soluble aluminium salts, e.g. potassium aluminium sulphate or aluminium sulphate.

The equivalence ratio of soluble metal salt to organic base may be from 1:9 to 3:1, preferably from 1:3 to 3:1. The use of this metal salt addition is of particular value in providing less tacky, harder beads from compositions prepared from a high level of the defined organic acids of this invention.

The process of the invention may be carried out in various ways, and the pigment dispersion may be contacted with the organic carrier before or after heating.

In one method the organic acid as a solution of its alkali metal salt or the organic base as a solution of its acetate salt, is added to a pigment slurry at pH 8–10 or pH 4–5 respectively in the presence of a protective colloid at room temperature. The mixture is then heated to a temperature above the melting point of the organic carrier to be used. The complementary organic base or acid is then added as its soluble salt and the mixture is then made substantially neutral. The solid organic carrier is then added and the mixture is agitated until pigmented beads are produced. In a second method, all the components are mixed at room temperature, the pH adjusted to substantially neutral and then the mixture is heated with agitation to a temperature above the melting point of the organic carrier.

In a third method, the pigment dispersion and aqueous protective colloid are heated to a temperature above the melting point of the organic carrier, and the other components, as in method one above, are added at this temperature.

In a fourth method, the pigment dispersion, aqueous protective colloid, organic acid and organic base are mixed at room temperature, neutralised and then heated to a temperature above the melting point of the organic carrier which is then added.

In a fifth method, the pigment dispersion, organic acid and organic base are mixed at room temperature, neutralised and then heated to a temperature above the melting point of the organic carrier. The heated mixture is then added to a mixture of the organic carrier and aqueous protective colloid in water at the same temperature.

In a sixth method, a mixture of the pigment dispersion and the organic acid at pH10 is heated to above the melting point of the organic carrier and then added to a mixture of the organic carrier, protective colloid and organic base in water at pH 4–5 at the same temperature, and the pH is then adjusted to 7.

In a seventh method, the pigment dispersion is heated to above the melting point of the organic carrier and added to a mixture of the organic carrier, organic acid, organic base and protective colloid in water at a similar temperature and the pH is then adjusted to 7.

In each method it is necessary that the protective colloid is present before the organic carrier is added to any mixture which is at a temperature above its melting point.

It should also be noted that some of the above-mentioned compounds may be present during the pigment preparation, for example, Armeen T (a $C_{18}$ alkyl amino) may be present during an azo coupling. Equally, to those skilled in the art, it will be obvious that water soluble forms of these organic acids and bases may be used to redisperse pigment presscake or powder.

The pigmented beads may be recovered by any desired method. They may, for example, be filtered off and washed. This may be done on a screen to give quick removal of the water. Filtration of conventional pigment slurries is slow and results in a presscake having about 80–90% of water. The beads which contain only 50% of water may then be dried, either in a conventional oven or in an air stream. In some instances it may be necessary to cool the pigmented beads to avoid aggregation or coalescence during filtration.

Provided that the organic carrier used is compatible with the desired system to be coloured, the beads are readily incorporated therein to give an evenly coloured product.

The process of the present invention produces a good yield of well formed free flowing beads which can be readily dispersed into application media. By contrast, poor yields of irregularly shaped granules having a wide distribution and poor dispersibility are obtained when lower proportions of organic compound are used than those specified above. By low yield we mean that on isolating the material from the aqueous slurry by filtration and washing on a 60 mesh sieve (British Standard) a large proportion of pigment particles is contained in the filtrate rather than in the product on the screen.

The invention also provides a method of pigmenting high molecular weight organic material which comprises incorporating therein a composition as defined above.

The invention will be illustrated by reference to the following Examples, in which parts are parts by weight.

EXAMPLE 1

20 Parts of C.I. Pigment Yellow 12, modified according to Example 1 of our co-pending Application No. 2361/73, was prepared in 350 parts of water. 0.5 parts of hydroxy ethyl cellulose (Natrosol 250 HR) was wetted with 2 parts methanol and rinsed into the slurry with water. This mixture was stirred at 250 r.p.m. and the pH was adjusted to 10. 5.32 parts of Staybelite resin as its sodium salt dissolved in 80 parts of water was added to the slurry dropwise over 5 minutes. The mixture was heated to 80° C. and 4.3 parts of a $C_{18}$ alkylamine (Armeen T) as its acetate salt dissolved in 60 parts of water was added to the slurry dropwise, over 5 minutes. 0.46 parts of anhydrous calcium chloride in 10 parts of water was added and the pH adjusted to 7.0 with acetic acid. 10 parts of oleamide (Armid O) was added as a solid and the stirring was continued for 2 hours at 80° C. when the aqueous phase was substantially free of pigment. The resultant bead product was recovered on a BS60 mesh sieve, washed free of salt with cold water and dried in an air stream at 40° C. to give 39.6 parts of a pigmented bead. The pigmented beads thus produced could be readily dispersed into a toluene/aliphatic hydrocarbon solution of a phenolic modified resin/zinc-calcium publication gravure medium.

EXAMPLE 2

Example 1 was repeated, except that 4.68 parts of the $C_{18}$ alkyl amine was used, and no addition of anhydrous calcium chloride was made. The resultant product had similar properties to the product from Example 1.

EXAMPLE 3–28

The following table of examples shows products prepared from different acids, amines, carriers and pigments as in Example 2. The precentage yield is the precentage of beads retained on a 60 mesh BS sieve.

The resulting products were tested in at least one of the following systems:
  a. publication gravure media according to the procedure of Example 1.
  b. milled into plasticised polyvinyl chloride
  c. milled into rubber In all cases a good dispersion was obtained. The compositions and results are given in the following Table.

| Example | % Acid | | % Amine | | % organic compound | % Pigment | | % Yield | Time | Test media |
|---|---|---|---|---|---|---|---|---|---|---|
| 3 | 16.3 | St. | 8.7 | D.T. | 25 | A.O. | 50 Y.12 | 99.5 | 2 hrs. | G |
| 4 | 15.9 | Ol | 9.1 | D.T. | 25 | A.O. | 50 Y.12 | 95.0 | 2 hrs. | G |
| 5 | 13.3 | St. | 11.7 | A.T. | 25 | A.O. | 50 Y.12 | 95.0 | 2 hrs. | G |
| 6 | 7.6 | St. | 7.4 | R.A.D | 35 | A.O. | 50 Y.12 | 98.8 | 2 hrs. | G |
| 7 | 10.7 | St. | 9.3 | A.T. | 20 | A.O. | 60 Y.12 | 97.8 | 2 hrs. | G |
| 8 | 5.3 | St. | 4.7 | A.T. | 30 | A.O. | 60 Y.12 | 100 | 2 hrs. | G |
| 9 | 4.0 | St. | 3.5 | A.T. | 22.5 | A.O. | 70 Y.12 | 100 | 2 hrs. | G |
| 10 | 8.0 | St. | 7.0 | A.T. | 15 | A.O. | 70 Y.12 | 100 | 2 hrs. | G |
| 11 | 17.3 | St. | 15.2 | A.T. | 17.5 | A.O. | 50 Y.12 | 100 | 2¾hrs. | G |
| 12 | 7.5 | St. | 17.5 | A.T. | 25 | A.O. | 50 Y.12 | 97.3 | 2 hrs. | G |
| 13 | 5 | St. | 5 | A.T. | 10 | A.O. | 80 Y.12 | 98.8 | 5½hrs. | G |
| 14 | 16.3 | St. | 8.7 | D.T. | 25 | C.P. | 50 Y.12 | 99.5 | 2 hrs. | G |
| 15 | 15.3 | St. | 9.7 | TS | 25 | A.O. | 50 Y.12 | 85.8 | 2 hrs. | G |
| 16 | 7.6 | St. | 7.4 | R.A.D | 35 | A.O. | 50 Y.12 | 98.8 | 2 hrs. | G |
| 17 | 13.3 | St. | 11.7 | A.T. | 25 | A.O. | 50 Y.13 | 96.8 | 2 hrs. | PVC |
| 18 | 17.2 | St. | 10.8 | TS | 25 | A.O. | 50 Y.12 | 96.8 | 4 hrs. | G |
| 19 | 13.3 | St. | 11.7 | A.T. | 25 | G.T.P. | 50 Y.12 | 96.3 | 4 hrs. | G.R. PVC |
| 20 | 13.3 | St. | 11.7 | A.T. | 25 | BT150 | 50 Y.12 | 100 | 2 hrs. | G |
| 21 | 13.3 | St. | 11.7 | A.T. | 25 | TGMS | 50 Y.12 | 96.5 | 2½hrs. | G |
| 22 | 13.3 | St. | 11.7 | A.T. | 25 | G.T.S. | 50B15.3 | 95.0 | 2 hrs. | G.R. PVC |
| 23 | 13.3 | St. | 11.7 | A.T. | 25 | G.T.P. | 50B15.3 | 98.0 | 2 hrs. | G.R. PVC |
| 24 | 13.3 | St. | 11.7 | A.T. | 25 | A.O. | 50Y93 | 94.5 | 2 hrs. | PVC |
| 25 | 13.3 | St. | 11.7 | A.T. | 25 | G.T.P. | 50Y93 | 98.0 | 2 hrs. | PVC |
| 26 | 13.3 | St. | 11.7 | A.T. | 25 | G.T.S. | 50Y93 | 96.3 | 2 hrs. | PVC |
| 27 | 13.3 | St. | 11.7 | A.T. | 25 | C.A. | 50Y93 | 97.3 | 2 hrs. | PVC |

-continued

| Example | % Acid | | % Amine | | % organic compound | | % Pigment | % Yield | Time | Test media |
| --- | --- | --- | --- | --- | --- | --- | --- | --- | --- | --- |
| 28 | 13.3 | St. | 11.7 | A.T. | 25 | C.S.P. | 50Y93 | 96.3 | 2 hrs. | PVC |

St = Staybelite Resin (hydrogenated rosin)
D.T. = Duomeen T (long chain alkyl diamine)
A.T. = Armeen T (long chain alkylamine)
R.A.D. = Rosin Amine D
A.O. = Armid O -oleamide
50 Y.12 = 50% C.I. Pigment Yellow 12
Ol = Oleic acid
TS = Trinoram S (long chain alkyl triamine)
C.P. = Cetyl Palmitate
G.T.P. = Glyceryl Tripalmitate
BT150 = Benzoflex T.150 (triethylene glycol dibenzoate)
TGMS = Triethyleneglycol Monostearate
G.T.S. = Glyceryl Tristearate
C.A. = Cetyl Alcohol
50B.15.3 = 50% of C.I. Pigment Blue 15.3
50Y93 = 50% C.I. Pigment Yellow 93
C.S.P. = Cithrol C.S.P. (ester of naturally occurring fatty acids and alcohols
G = publication gravure
PVC = Polyvinylchloride
R = Rubber

EXAMPLE 29

20 Parts of C.I. Pigment Blue 15.3 was stirred in 350 parts water. 0.2 Parts hydroxyethyl cellulose (Natrosol 250HR) was wetted with 2 parts methanol and rinsed into the slurry with water. This mixture was stirred at 250 r.p.m. and the pH was adjusted to 10. 5.32 parts of Staybelite resin as its sodium salt dissolved in 80 parts water was added to the slurry dropwise over 5 minutes. The mixture was heated to 80° C and 4.68 parts of a $C_{18}$ alkylamine (Armeen T) as its acetate salt dissolved in 60 parts of water was added to the slurry dropwise over 5 minutes. The pH was adjusted to 8 using 10% w/w acetic acid. The pH was finally adjusted to 7 using 10% w/w zinc chloride solution. 10 parts of oleamide (Armid O) was added as a solid and the stirring was continued for 1 hour at 80° C when the aqueous phase was substantially clear of pigment. The resultant bead product was recovered on a BS.60 mesh sieve, washed free of salt with cold water and dried in an oven at 40° C.

The pigmented beads thus produced could be readily dispersed in publication gravure medium.

EXAMPLE 30

20 Parts C.I. Pigment Yellow 12 modified according to Example 83 of our British Pat. No. 1,356,253 was prepared in 350 parts water. 0.5 Parts of hydroxyethyl cellulose (Natrosol 250HR) was wetted with 2 parts methanol and rinsed into the slurry with water. The mixture was stirred at 250 r.p.m. and 15 parts of Staybelite Resin as its sodium salt dissolved in 225 parts water was added dropwise over 5 minutes. This mixture was heated to 80° C and 5 parts of cetyl alcohol as solid was added. The pH was adjusted to 9 with 10% w/w acetic acid and then to 7 with 10% w/w zinc chloride solution. Stirring was continued for 2 hours at 80° C when the aqueous phase was substantially free of pigment. The yellow bead product was isolated as in Example 1 and were readily dispersed in publication gravure medium.

EXAMPLE 31

20 Parts C.I. Pigment Green 7 was stirred in 400 parts water. 0.2 Parts of hydroxyethyl cellulose (Natrosol 250HR) was wetted with 2 parts methanol and rinsed into the slurry with water. 0.4 Parts potassium oleate dissolved in 8 parts water and 2 parts Staybelite Resin as its potassium salt dissolved in 60 parts water were added to the slurry. The mixture was heated to 80° C with stirring at 250 r.p.m. over 30 minutes.

0.5 Parts of a $C_{18}$ alkylamine (Armeen T) as its acetate dissolved in 8 parts water was added followed by 3 parts of zinc chloride dissolved in 50 parts water. 17 Parts of dicyclohexyl phthalate (Howflx CP) was added and stirred at 89° C for 1 hour. The resultant green beads were isolated as in Example 1 and readily dispersed in PVC.

EXAMPLE 32

20 Parts of a resinated C.I. Pigment Red 57 (Ca salt) was prepared in 450 parts water. 1 part of hydroxy ethyl cellulose wetted with 2 parts of methanol was rinsed into the slurry with water. The mixture was stirred at 250 r.p.m. and heated to 65° C. The pH was adjusted to 4.0 with dilute acetic acid and 2.37 parts of $C_{18}$ alkylamine (Armeen T) as its acetate in 25 parts of water, added dropwise over 5 minutes. The temperature was then raised to 90° C. and pH adjusted to 7.5 with 10% w/w sodium hydroxide. 15 parts of a 1:1 mixture of a hydrocarbon resin (Hercules A.80) and cetyl alcohol (premelted together and cooled) was added as a solid and stirred at 90°–95° C. until the aqueous phase was almost clear of pigment (30 mins). 2.63g. Staybelite resin as its sodium salt in 25 parts water was added dropwise over 5 minutes while the pH was maintained at pH 7.5 by simultaneous addition of dilute acetic acid.

Stirring was contained at 90°–95° C. for a further 60 minutes and the resultant product was recovered on a BS.60 mesh sieve washed free of salts cold water and dried in an oven at 70° C. to give 40.0 g red beads.

The pigmented beads thus produced gave excellent results in publication gravure medium.

EXAMPLE 33

Example 1 was repeated, except that all the components were mixed at room temperature. When the additions were completed the resultant mixture was heated to 80° C. with stirring to complete the preparation and give a satisfactory product similar to that of Example 1.

EXAMPLE 34

Example 1 was repeated, except that the mixture was heated to 80° C. after was hydroxy ethyl cellulose addition, with no adverse effects.

EXAMPLE 35

0.5 Part of hydroxy ethyl cellulose (Natrosol 250HR), wetted with 2 parts of methanol were stirred into 200 parts of water at room temperature. The pH of the mixture was adjusted to 10. 5.32 Parts of Staybelite resin as its sodium salt, dissolved in 80 parts of water, were added dropwise over 5 minutes. 4.68 Parts of a $C_{18}$ alkylamino as its acetate salt, dissolved in 60 parts of water, were added dropwise over 5 minutes. The pH of the mixture was adjusted to 7. 10 Parts of oleamide were added and the mixture was heated with stirring to 80° C., whereupon the organic carrier melted to form an emulsion with the water. 20 Parts of C.I. Pigment Yellow 12, prepared as in Example 1, were heated to 80° C. and added to the molten carrier mixture over 10 minutes and the pH was readjusted to 7. The product was formed and isolated as in Example 1. The resultant 38.1 parts of yellow beads could be readily dispersed in publication gravure medium.

EXAMPLE 36

20 Parts of C.I. Pigment Yellow 12 were prepared in 350 parts of water in the presence of 4.68 parts of a $C_{18}$ alkylamine in the form of its acetate salt. 0.5 Parts of hydroxy ethyl cellulose wetted with methanol were added with stirring, followed, dropwise, by 5.32 parts of Staybelite resin as its sodium salt dissolved in 80 parts of water. The mixture was adjusted to pH7 and heated to 80° C. 10 Parts of oleamide were added and the mixture was stirred until the aqueous phase was substantially free of pigment. The resultant yellow beads (36.6 parts) were recovered as in Example 1 and could be readily dispersed in publication gravure medium.

EXAMPLE 37

5.32 Parts of Staybelite resin as its sodium salt dissolved in 80 parts of water were added to 20 parts of C.I. Pigment Yellow 12, prepared as in Example 1, at pH10. The resultant mixture was heated to 80° C. and added over 10 minutes to a stirred mixture of 200 parts of water at 80° C. containing 4.68 parts of a $C_{18}$ alkylamine in the form of its acetate salt, 0.5 part hydroxy ethyl cellulose and 10 parts of oleamide. The pH was adjusted to 7 and the stirring and isolation were carried out as in Example 1, giving 38.9 parts of yellow beads which were readily dispersed in publication gravure medium.

EXAMPLE 38

Example 37 was repeated, except that the alkylamine was added to the pigment dispersion and not to the organic carrier suspension before the final mixing. The resultant product had similar properties to that of Example 37.

We claim:

1. Pigment composition in the form of free-flowing, non-dusting, non-aggregating, non-sticky generally spherical beads which comprises from 40 to 80% by weight of a pigment or water-insoluble dyestuff from 5 to 40% by weight of a normally solid water-insoluble organic compound carrier or mixture of carriers melting below 100° C, from 2.5 to 25% of an organic acid having at least 8 carbon atoms and from 1.5 to 25% of an organic base having at least 8 carbon atoms, the amount of acid plus base being from 5 to 35% by weight of the total composition, and wherein said beads have a particle size of from 0.5 to 5 mm diameter.

2. Composition as claimed in claim 1, in which the organic carrier or mixture of organic carriers melt at a temperature of from 40° to 100° C.

3. Composition as claimed in claim 1, in which the amount of pigment is from 50 to 70% by weight, of organic carrier is from 15 to 40% by weight, of organic acid is from 5 to 187.5% by weight, and of organic base is from 5 to 17.5% by weight.

4. Composition as claimed in claim 1 which also contains a salt of a metal of Group II or III of the Periodic Table and the organic acid.

5. Composition as claimed in claim 4, in which the metal is beryllium, magnesium, calcium, strontium, barium, zinc or aluminium.

6. Composition as claimed in claim 1, in which the organic acid is a $C_8$ to $C_{22}$ alkyl or alkenyl fatty carboxylic acid, $C_8$ to $C_{22}$ alkyl or alkenyl ring-substituted benzoic acid, a $C_8$ to $C_{22}$ alkoxy or alkenyloxy ring-substituted benzoic acid, a $C_8$ to $C_{22}$ N-alkyl or alkenyl phthalamic acid, a $C_8$ to $C_{22}$ alkyl or alkenyl ring-substituted benzene sulphonic acid, rosin acid or hydrogenated rosin acid, the organic base is a $C_8$ to $C_{22}$ fatty primary amine or N,N-dimethyl derivative thereof, rosin amine, N,N-di-$C_8$ to $C_{22}$ alkyl or alkenyl amine, fatty diamine, fatty triamine or alkyl imidazoline, and the organic carrier is a fatty alcohol, fatty ester, fatty amide, fatty ester of a polyol benzoic acid ester of a polyol, phthalate ester, fatty oxazoline, alkylimide or alkyl hydantoin, or mixtures thereof.

7. Composition as claimed in claim 1, in which the organic carrier is a mixture containing compounds which, alone, melt above 100° C.

8. Composition as claimed in claim 7, in which the organic carrier contains a hydrocarbon resin, cholesterol, magnesium behenate, zinc rosinate and/or a rosin ester.

9. Process for the production of a pigment composition according to claim 1 which comprises contacting with agitation an aqueous dispersion of a pigment or water-insoluble dyestuff with a normally solid water-insoluble organic carrier melting below 100° C. at a temperature at which the organic carrier is molten, in the presence of an aqueous protective colloid, and a mixture of an organic acid having at least 8 carbon atoms and an organic base having at least 8 carbom atoms rendered insoluble by making the pH of the mixture substantially neutral, and allowing the aqueous phase to become substantially free of pigment or water-insoluble dyestuff by its association with the organic carrier, and recovering the resultant pigmented beads, said beads having a particle size of from 0.5 to 5 mm diameter.

* * * * *

UNITED STATES PATENT AND TRADEMARK OFFICE
CERTIFICATE OF CORRECTION

PATENT NO. : 4,015,999
DATED : April 5, 1977
INVENTOR(S) : George Heddle Robertson & John Andrew Stirling It is certified that error appears in the above-identified patent and that said Letters Patent are hereby corrected as shown below:

Column 10, line 19, "187.5%" should read -- 17.5% --.

Signed and Sealed this

Thirteenth Day of September 1977

[SEAL]

Attest:

RUTH C. MASON
Attesting Officer

LUTRELLE F. PARKER
Acting Commissioner of Patents and Trademarks